(12) United States Patent
Goelles et al.

(10) Patent No.: US 8,908,271 B2
(45) Date of Patent: Dec. 9, 2014

(54) LASER SCANNING MICROSCOPE AND ITS OPERATING METHOD

(71) Applicant: Carl Zeiss Microimaging GmbH, Jena (DE)

(72) Inventors: Michael Goelles, Jena (DE); Ralf Netz, Jena (DE); Frank Hecht, Weimar (DE); Joerg-Michael Funk, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 13/941,465

(22) Filed: Jul. 13, 2013

(65) Prior Publication Data

US 2013/0307959 A1    Nov. 21, 2013

Related U.S. Application Data

(63) Continuation of application No. 13/299,515, filed on Nov. 18, 2011, now abandoned, which is a continuation of application No. 11/783,255, filed on Apr. 6, 2007, now abandoned.

(30) Foreign Application Priority Data

Jul. 28, 2006   (DE) .................... 10 2006 034 906

(51) Int. Cl.
*G02B 21/06*    (2006.01)
*G01B 11/14*    (2006.01)
*G02B 21/00*    (2006.01)

(52) U.S. Cl.
CPC .............. *G01B 11/14* (2013.01); *G02B 21/008* (2013.01)
USPC ...................... 359/385; 359/197.1; 382/289

(58) Field of Classification Search
None
See application file for complete search history.

(56) References Cited

U.S. PATENT DOCUMENTS

| 5,034,613 | A | 7/1991 | Denk et al. |
| 6,094,300 | A | 7/2000 | Kashima et al. |

(Continued)

FOREIGN PATENT DOCUMENTS

DE        19702753 A1    7/1998

(Continued)

OTHER PUBLICATIONS

Karl Otto Greulich, "Micromanipulation by Light in Biology and Medicine: Laser Microbeam and Optical Tweezers", Preface of the Book, Oct. 1, 1999, Birkhauser Verlag.

*Primary Examiner* — Derek S Chapel

(74) *Attorney, Agent, or Firm* — Westerman, Hattori, Daniels & Adrian, LLP

(57) ABSTRACT

Laser scanning microscope and its operating method in which at least two first and second light distributions activated independently of each other and that can move in at least one direction illuminate a sample with the help of a beam-combining element, and the light is detected by the sample as it comes in, characterized by the fact that the scanning fields created by the light distributions on the sample are made to overlap mutually such that a reference pattern is created on the sample with one of the light distributions, which is then captured and used to create the overlap with the help of the second light distribution (correction values are determined) and/or a reference pattern arranged in the sample plane or in an intermediate image plane is captured by both scanning fields and used to create the overlap (correction values are determined) and/or structural characteristics of the sample are captured by the two scanning fields as reference pattern and used to create the overlap in which correction values are determined.

30 Claims, 9 Drawing Sheets

(56) References Cited

U.S. PATENT DOCUMENTS

| | | |
|---|---|---|
| 6,159,749 A | 12/2000 | Liu |
| 6,888,148 B2 | 5/2005 | Wolleschensky et al. |
| 7,271,906 B2 | 9/2007 | Fujimoto |
| 2004/0233407 A1 | 11/2004 | Nishi et al. |
| 2006/0012864 A1 | 1/2006 | Funk et al. |
| 2007/0159689 A1 | 7/2007 | Schau et al. |

FOREIGN PATENT DOCUMENTS

| | | |
|---|---|---|
| DE | 10257237 A1 | 6/2003 |
| DE | 102004016433 A1 | 10/2005 |
| DE | 102004034987 A1 | 2/2006 |

FIG. 1
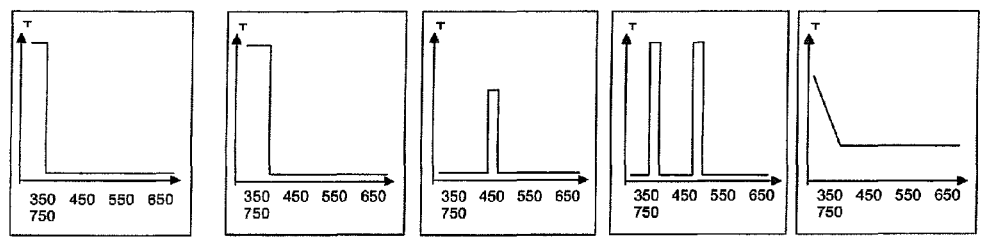
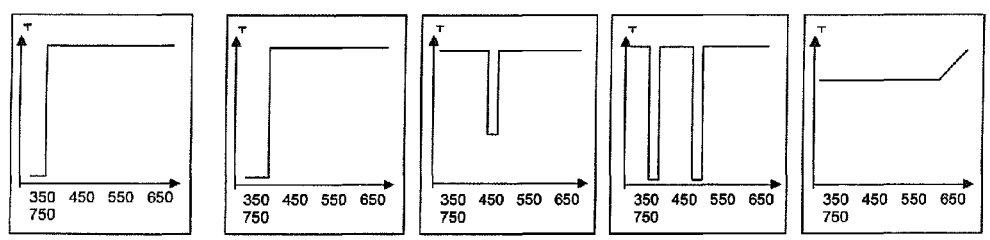
FIG. 2
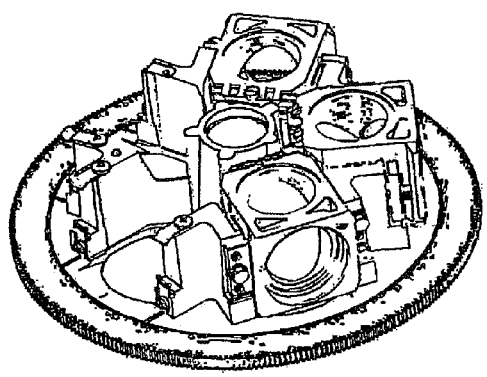

Affine Transformation:

Minimum Number of Items: 3

Imaging System              Manipulating System $$\begin{pmatrix} m\Delta x \\ n\Delta y \end{pmatrix} = \begin{pmatrix} m_0 \Delta x \\ n_0 \Delta y \end{pmatrix} + \begin{pmatrix} \Delta \tilde{x} \cos(\psi) & -\Delta \tilde{y} \sin(\psi) \\ \Delta \tilde{x} \sin(\psi) & \Delta \tilde{y} \cos(\psi) \end{pmatrix} \begin{pmatrix} k \\ j \end{pmatrix}$$

$$\Rightarrow \begin{pmatrix} m \\ n \end{pmatrix} = \begin{pmatrix} m_0 \\ n_0 \end{pmatrix} + \begin{pmatrix} [\Delta \tilde{x}/\Delta x] \cdot \cos(\psi) & -[\Delta \tilde{y}/\Delta x] \cdot \sin(\psi) \\ [\Delta \tilde{x}/\Delta y] \cdot \sin(\psi) & [\Delta \tilde{y}/\Delta y] \cdot \cos(\psi) \end{pmatrix} \begin{pmatrix} k \\ j \end{pmatrix}$$

$$\Rightarrow \begin{pmatrix} m \\ n \end{pmatrix} = \begin{pmatrix} m_0 \\ n_0 \end{pmatrix} + \begin{pmatrix} a_{11} & a_{12} \\ a_{21} & a_{22} \end{pmatrix} \begin{pmatrix} k \\ j \end{pmatrix}$$

— Dictated Coordinates

— Measured Coordinates

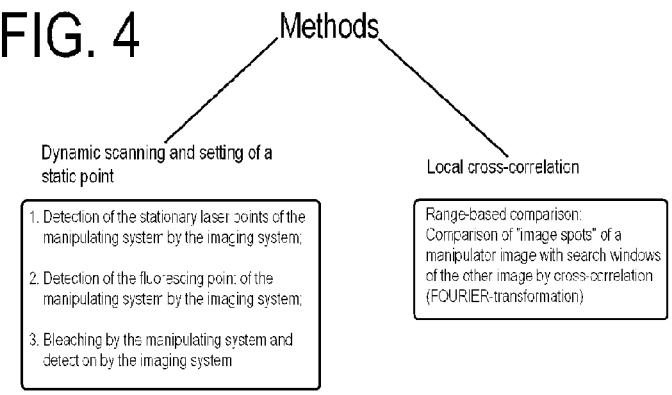

Methods

Dynamic scanning and setting of a static point
1. Detection of the stationary laser points of the manipulating system by the imaging system;
2. Detection of the fluorescing point of the manipulating system by the imaging system;
3. Bleaching by the manipulating system and detection by the imaging system

Local cross-correlation
Range-based comparison: Comparison of "image spots" of a manipulator image with search windows of the other image by cross-correlation (FOURIER-transformation)

FIG. 5a

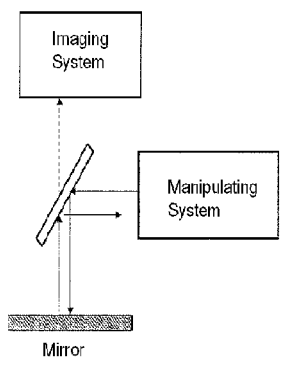

FIG. 5b

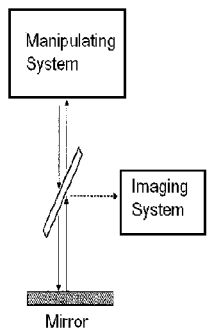

FIG. 5c

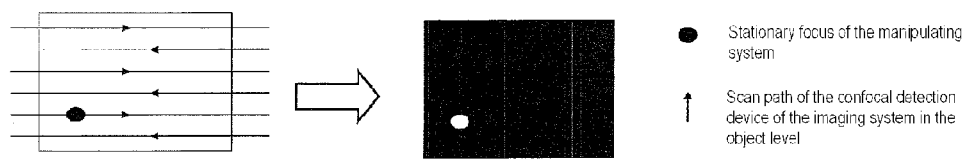

● Stationary focus of the manipulating system

↑ Scan path of the confocal detection device of the imaging system in the object level

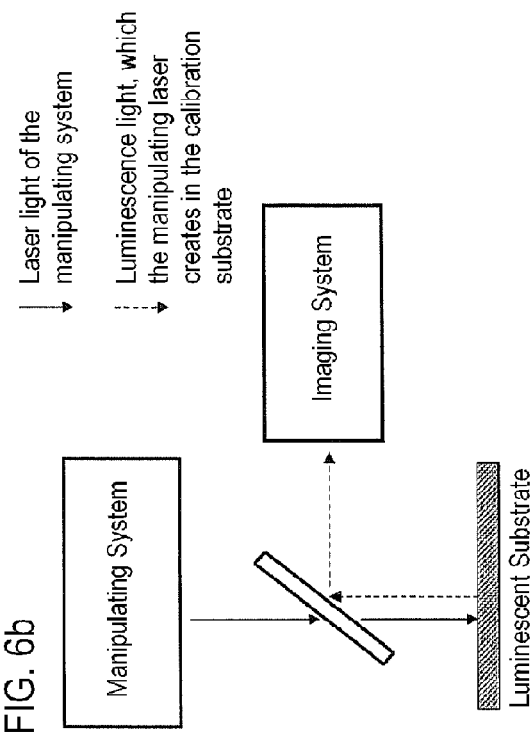
FIG. 6b
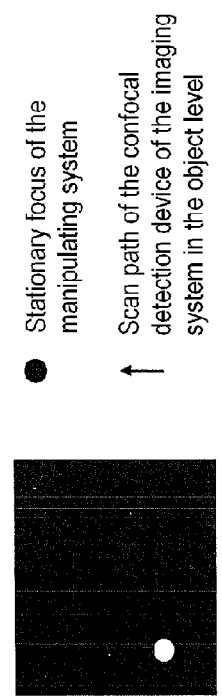
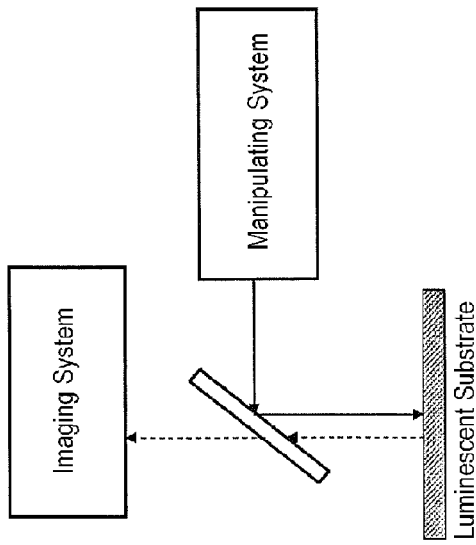
FIG. 6a
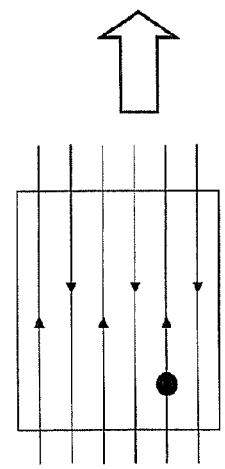
FIG. 6c

LASER SCANNING MICROSCOPE AND ITS OPERATING METHOD

CROSS-REFERENCE TO RELATED APPLICATIONS

The present patent application is a continuation of application Ser. No. 13/299,515, filed Nov. 18, 2011, which is a continuation of application Ser. No. 11/783,255, filed Apr. 6, 2007, which claims priority from German Application No. 10 2006 034 906.7, filed Jul. 28, 2006, all of which are incorporated herein by reference in their entireties.

BACKGROUND OF THE INVENTION (1) Field of the Invention

The present invention relates to methods of operating a microscope, in general, and to a method of operating a laser scanning microscope having at least two independently controlled scanning systems.

(2) Description of Related Art

Confocal laser microscopy is, among other things, the tool for the defined control of micro objects. Versatile methods of examining and influencing microscopic objects were recommended on this basis—e.g., Denk in U.S. Pat. No. 5,034,613, TPA, Liu in U.S. Pat. No. 6,159,749, Tweezer or Karl Otto Greulich in "Micromanipulation by Light in Biology and Medicine" 1999. A combination of a point-scanning or line-scanning imaging system and a "manipulator" system has evoked increasing interest in the specialized world.

Interest in observing and analyzing fast microscopic processes has created new devices and processes (e.g., line scanner LSM 5 LIVE), whose combination with the manipulation methods mentioned above leads to new insights. In this context, the simultaneous microscopic observation of a light induced, locally resolved sample manipulation with the help of a suitable imaging system occupies the foreground (U.S. Pat. No. 6,094,300 and DE 102 004 03 4987 A1). Modern microscopes therefore try to offer the maximum possible number of flexible and optically equivalent coupling and decoupling positions (DE 102 004 01 6433 A1).

The simultaneous availability of at least two coupling positions for independent scanning systems is very important in this context for avoiding limitations in time resolution due to slow mechanical control processes. In addition to the tube interface, there are other coupling positions on the sides of the microscope stands (preferably in an extended infinite space between the microscope objective and tube lens; "side ports") as well as on the rear side of the stand (typically optically modified reflected or transmitted light axes with suitable tube lens; "rear ports") as well as the bottom side ("base port"). In principle, arrangements with a common beam direction (either reflected light or transmitted light) or the opposite beam direction (reflected light and transmitted light) are possible. Apart from the practical background, the technical instrument-based view of the common beam direction is often preferred.

At least one element must be used in this case that combines the beam paths of the two instruments in the space between the scanners of the simultaneously operated scanning systems and the objective. According to the prior art, one can think of the most varied of beam-combining elements such as for instance, optical-mechanical components like suitably coated beam-combining, flat plates and beam-combining wedges, beam-combining cubes and a polarization splitter. Further, beam-combining acousto-optical modulators and deflectors are also conceivable.

The mechanical requirements related to the precision of location and angle of this beam-combining element are very high. A faulty installation angle $\alpha$ causes tilting of a beam inclination by $2\alpha$ in reflection. For example, if the beam-combining element is in the infinite space between a tube lens of focal length $f_{TL}=164$ mm and an objective of the nominal foreground $M=f_{TL}/f_{Obj}=40\times$ then this leads to an angular deviation of $2\alpha=1'$ (position deviation of the beam combiner 0.5') to a deviation $\Delta=(f_{TL}/M)*\tan 2\alpha=1.2$ μm of both scan fields in the object plane. In a field of view 18 (diagonal) this already corresponds to a deviation of approximately 0.4% of the lateral length of the scan field. In the usual image formats of 512×512 or 1024×1024, this corresponds to a deviation of 2-4 image pixels. In addition to the demanding mechanical requirements related to the mechanical positioning of the beam-combining element, there are similarly demanding tolerance specifications related to the mechanical interfaces of the imaging or manipulation scanning module (inclination errors and lateral shifting of interface, intermediate image position in axial direction, and rotation). Further, thermal influences (heating of the microscope system, and fluctuations in the environmental temperature) as well as undefined statistical effects, impose a condition that occurs especially in case of extremely precise measurements, the coverage of the scan fields in the manipulating and imaging systems must be adjusted repeatedly.

BRIEF SUMMARY OF THE INVENTION

To compensate for the pixel displacement (x, y) between the manipulating and imaging scanning modules that cannot be controlled fully through the mechanical tolerance chain, this patent suggests calibration in such a way that, through various methods, the position deviations of the scan fields of the two systems are determined and the coordinate transformations (scaling, rotation, shift) resulting therefrom are computed and taken into account in the control of at least one of the scanning systems.

In this context, it must be considered that the resulting image coverage parameters are influenced by numerous device settings. An example of this would be the different main beam splitters of a confocal laser scanning microscope, which in several commercial devices are arranged on a motorized main beam splitter wheel. If the excitation beams are reflected on the main beam splitter at less than 90°, minor angular errors are already observable in the scan field coverage. Examples of other adjustable device parameters that can influence the scan field coverage significantly are movable optics (e.g. viewing field or pupil zoom) as well as non-linear factors and dynamic deviations of the beam deflecting devices used in the respective scanning systems (e.g. selected scanning speed and scanning zoom in devices based on galvo scanners). Add to this the fact that the wavelength dependency of the z-position of the focal point is to be calibrated depending on the excitation and manipulation wavelengths used in different applications as well as of the objective used. The z-plane synchronization can be effected in an elegant way through moveable collimator optics of the imaging and/or manipulating system under scrutiny of the longitudinal chromatic aberration of the particular objective in use.

Depending on the particular application, the useful spectral range can extend basically from the ultraviolet to the infrared range for the imaging system as well as the manipulating system. Typical manipulation wavelengths used in applications are, e.g., 351, 355 and 364 nm (photo-uncaging), 405 nm (photo conversion, Kaede, Dronpa, PA-GFP), 488 and 532 nm (photo bleaching, FRET, FRAP, FLIP) as well as 780-900 nm (multi-photon bleach, e.g., MPFRAP, 2-photon uncaging; direct multi-photon stimulation). Depending on the combined wavelength as well as the coupling positions of the imaging system and the manipulating system, there are numerous types of dichroic beam combiners that are useful from the practical point of view. FIG. 1 shows a selection of possible spectral properties of beam combiner types that are relevant on a practical basis to applications in which the manipulation wavelengths of 355 nm, 405 nm, 488 and 532 nm can be used in the transmission as well as reflection direction. Neutral combining elements (e.g., T20/R80) can be used universally for different applications and they also enable simple applications in which the same laser wavelengths are used for the imaging system as well as the manipulating system (particularly FRAP).

Depending on the particular application, there is a typical requirement of using different beam combiner types in a microscope system. A motorized replacement device is used for this purpose. It can be, e.g., a motorized reflector turret in the area of the infinite space between the objective and tube lens, as illustrated in FIG. 2. An alternative to the illustrated reflector turret is, e.g., an appropriate reflector disk. The replacement device for the different beam combiner's conditions further influence factors that affect the coverage of the scan fields of the imaging system and manipulation system. Thus, already negligible mutual deviations of the beam combiner alignment lead particularly in the reflection direction to a measurable scan field shift.

Another problem is the ability to mechanically reproduce the scanning position (beam combiner location and beam combiner alignment) of the replacement device. Thus, on the one hand, the precision and reproduction capacity requirements of the replacement device increase as compared to traditional light-microscopic systems, and, on the other hand, claims of the practical management of the calibration method mentioned above. Even the complete replacement of the turret device shown in FIG. 2 can lead to a deviation of the scan field coverage, requiring a fresh calibration due to residual errors of the mechanical record.

In short, there is a need for the very general requirement of the simplest possible calibration method that allows the correction of the scan field coverage of the imaging system and the manipulating system as a function of varying device settings. This calibration method should particularly be used by the device user and if possible, it should be possible to execute it automatically.

BRIEF DESCRIPTION OF THE SEVERAL VIEWS OF THE DRAWINGS

FIG. 1 shows a selection of spectrally possible properties of beam combiner types;

FIG. 2 a motorized reflector turret in the area of the infinite space between the objective and tube lens;

FIG. 3b illustrates an affine transformation with reference to the orientation points P1-P3 and their position;

FIG. 4 provides a schematic overview of the different calibration methods for the determination of the scan field coverage;

FIG. 5a, the imaging system in transmission and the manipulating system in reflection are decoupled. In FIG. 5b it is just the opposite.

FIG. 5c shows a stationary focus of the manipulation system where at least three such focuses are detected directly in the direction of reflection in the imaging system.

FIGS. 6a-6c show the detection and use of a luminescent light point or a light point created elsewhere through frequency conversion.

DETAILED DESCRIPTION OF THE INVENTION

Figure 3A:
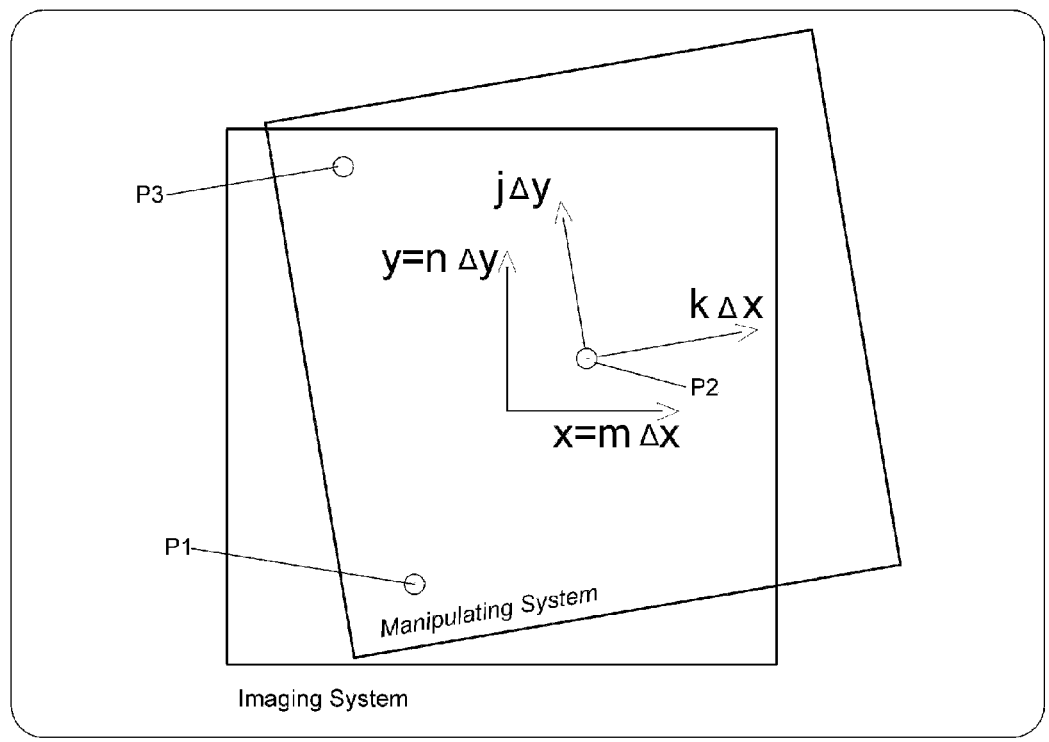
FIG. 3a illustrates the non-coinciding scan fields of an imaging scanning system (imaging) and a manipulation system (manipulating) with orientations.

The invention is described in greater detail in the following pages with the help of the following schematic diagrams:

FIG. 3a illustrates the non-coinciding scan fields of an imaging scanning (imaging) system and a manipulation (manipulating) system with orientations, deviating from each other, of the schematically represented X/Y orientation as well as orientation points P1-P3 whose position on both systems are used for overlapping.

FIG. 3b illustrates an affine transformation with reference to the orientation points P1-P3 and their position.

FIG. 4 shows the different methods that are described subsequently schematically; at the left the creation of static reference points by one of the scanning systems, preferably of the manipulation system (in reflection, fluorescence or two photon conversion, in general, each sample modification through illumination (also, e.g., ablation)), at the right the cross-correlation with the help of image characteristics of the two scanners.

In FIG. 5a, the imaging system in transmission and the manipulating system in reflection respectively are coupled and/or decoupled. In FIG. 5b it is just the opposite. FIG. 5c shows a stationary focus of the manipulation system where at least three such focuses are detected directly in the direction of reflection in the imaging system.

A luminescent light point or a light point created elsewhere through frequency conversion is detected and used, instead of the focus, in FIG. 6 a-c.

Figure 7:
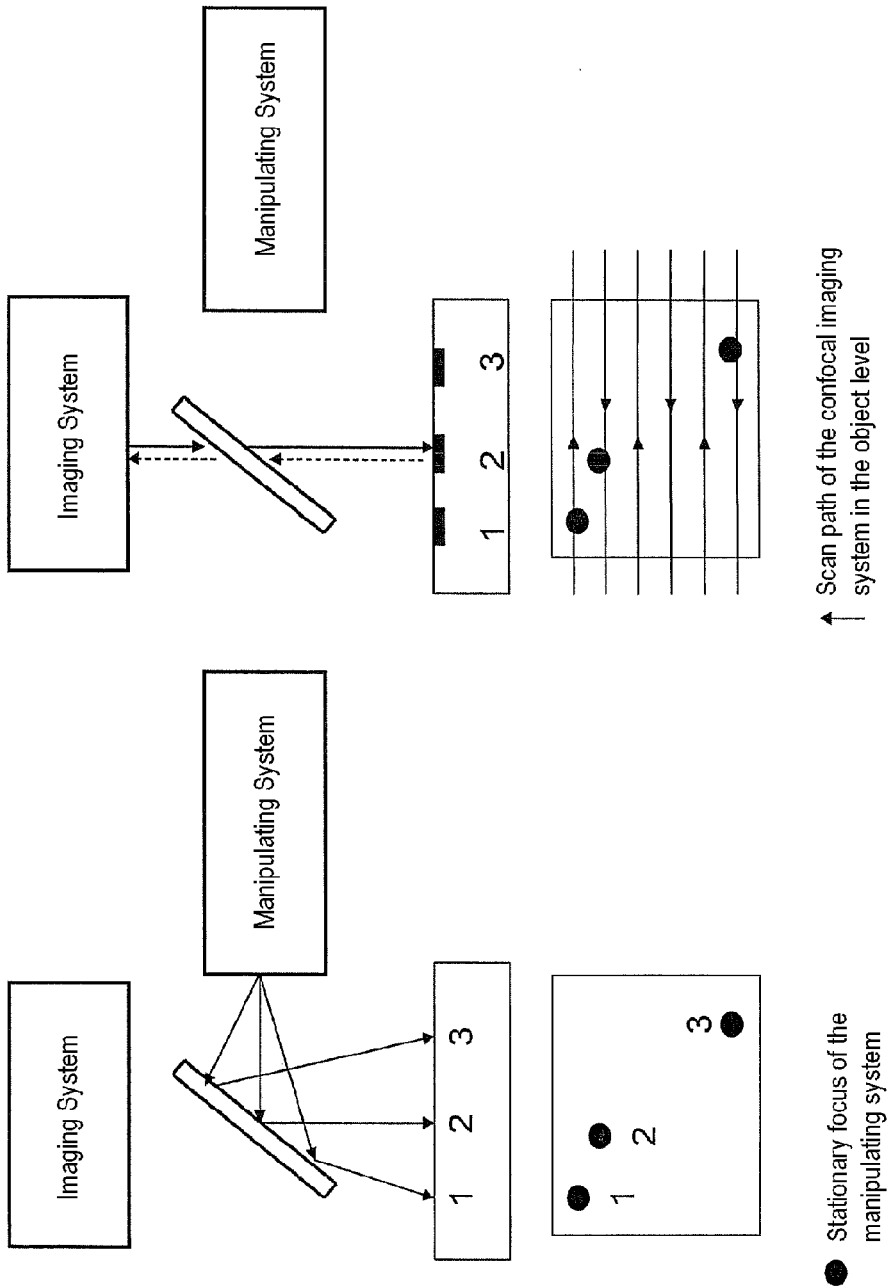
FIG. 7 illustrates how the light-inducing sample modifications created by the manipulation system are detected by the imaging system and used as points in FIG. 7.

The light induced sample modifications created by the manipulation system are detected by the imaging system and used as points in FIG. 7. This can happen statically one after another or even during the scanning movement of the two systems (through turning on and turning off of the manipulator light at different places).

Figure 8:
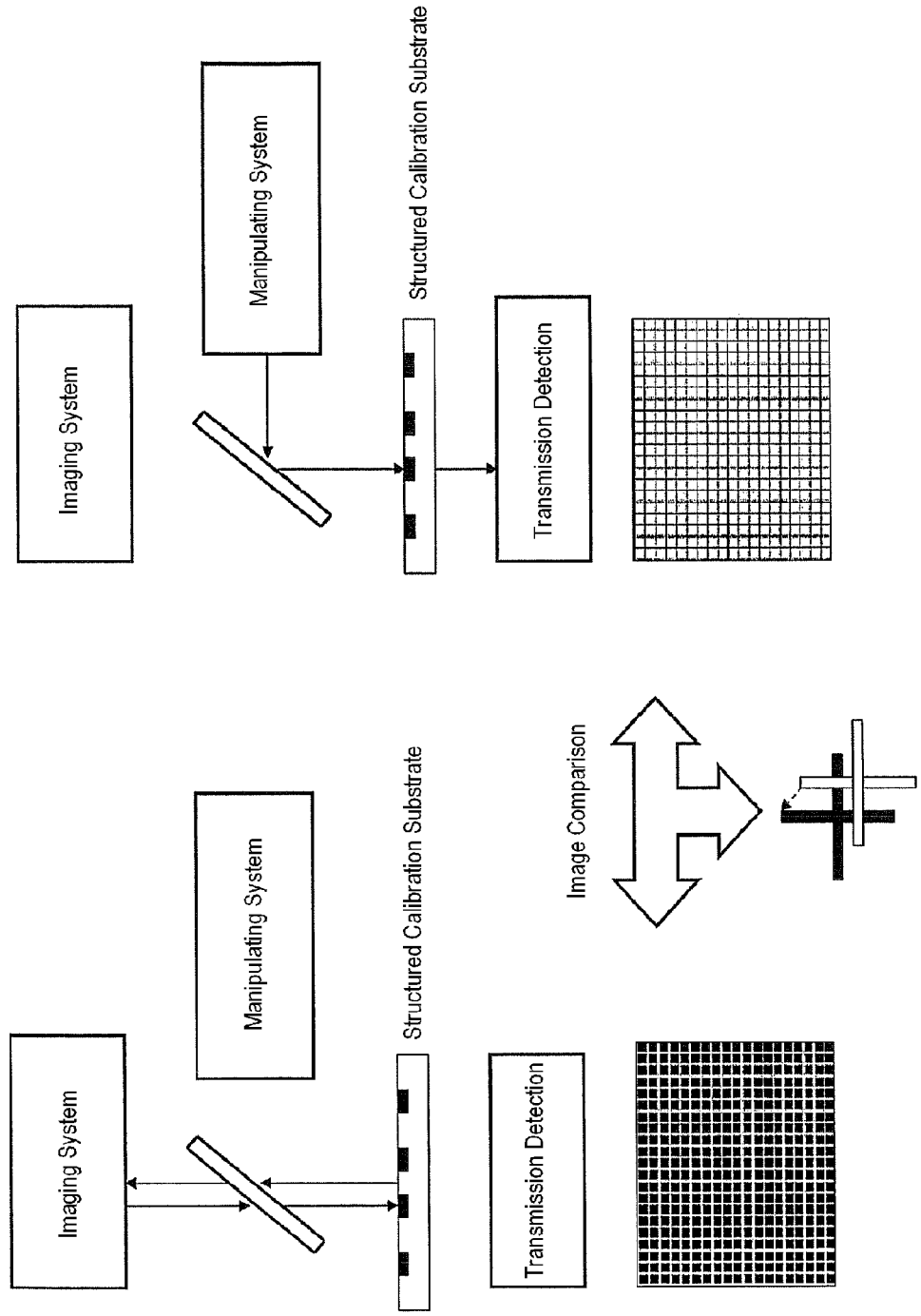
FIG. 8 shows a structured calibration substrate detected by both systems and the position of the lines used for calibration.

FIG. 8 shows a structured calibration substrate (shown as a grid) detected by both systems and the position of the lines used for calibration, either through cross-correlation or interactively by the user (mutual displacement in the display).

Figure 10:
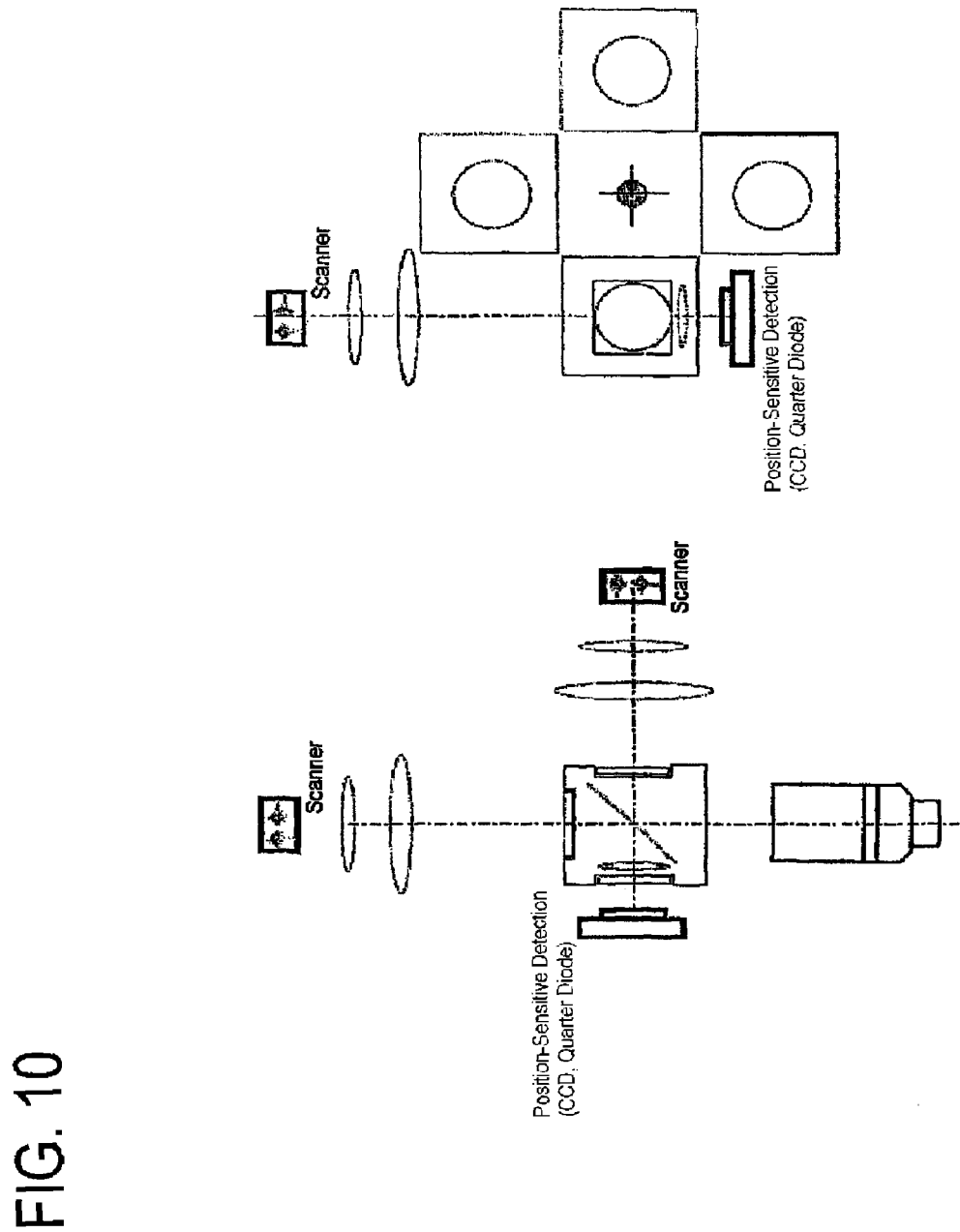
FIG. 10 shows a separately arranged detector in both systems directly in the beam combiner that detects the transmitted or reflected residual radiation for calibration and evaluation.

FIG. 10 shows a separately arranged detector in both systems (quadrant diode or CCD receiver) directly in the beam combiner that detects the transmitted or reflected residual radiation for calibration and evaluation. If a programmable, automatically controllable beam deflection device is used for the imaging and/or manipulating system, then the described problem of pixel-precise scan field coverage can be solved elegantly with the help of a suitable coordinate transformation. Thus for instance, in the absence of an angular distortion corresponding to FIG. 3a, the coordinate systems of the two scanning systems can be subjected to the following shifts even in the two-dimensional case:
  Parallel displacement along the translation vector ($m_0$, $n_0$)
  Rotated around the angle $\Psi$
  Narrowed or stretched along the x- or y-scaling factors.

In this case, an affine transformation of the k and j coordinates of the manipulating system to the respective m and n coordinates of the imaging system is possible with the help of an affine mapping (compare FIG. 3b):

$$m = m_0 + \alpha_{11} k + \alpha_{12} j \quad (1a)$$

$$n = n_0 + \alpha_{21} k + \alpha_{22} j \quad (1b)$$

Thus, if the coordinates of at least three points are defined in the two independent scanning coordinate systems within the framework of a suitable calibration, Equations (1a) and (1b) can be used to convert the coordinates of the two scanning systems into each other for random scan field points. A total of five image coverage parameters are to be determined in this calibration process: Offset (zero position), angle (mutual rotation) and three stretching parameters. This therefore enables control of the beam deflecting device of the manipulating system in such a way that a pixel-precise coverage with the object field of the imaging system is possible (or vice versa).

This method of implementing a pixel-precise scan field coverage of the two independent scanning systems requires that at least one system has a programmable, automatically controllable beam deflecting device.

This can be based on one of the following scanning principles:
  Galvo mirror or
  Deflectable, especially rotary or tilting mirror, e.g., step motor controlled deflecting mirror
  Polygon mirror
  Acousto-optical deflection devices, especially acousto-optical deflectors (AODs)
  Moving perforated mask, especially in the form of a Nipkow disk
  Moving (mono-mode) fibers
  Moveable objective or objective parts
  Mechanical x- and y-displacement of a suitable part or of the whole scanning system, e.g., with the help of acousto-optical modulators (As the two scanning systems must be independent of each other in the sense of the invention, a mechanical x- and y-displacement of the sample is not permissible.)

In the case of the Galvo mirror that is used frequently in commercial systems, a transformation, for example, according to Equation (1a, 1b) is possible through suitable adjustment of the gain and offset values of the associated drive electronics.

In confocal systems, coverage of the scanning coordinates of the imaging and manipulating system in three-dimensional space is possible. As in the plane, a transformation of the two scanning coordinate systems in space can be undertaken:

$$x = \phi_1(u,v,w) \quad (2a)$$

$$Y = \phi_2(u,v,w) \quad (2b)$$

$$z = \phi_3(u,v,w) \quad (2c)$$

Three-dimensional sample objects are detected in confocal imaging systems by taking microscopic images of the section planes x, y for each different sample depth z.

Between recordings of the individual confocal section images, the sample depth z is varied in each case through a mechanical displacement of the sample, the objective or the entire microscope unit. In addition to the customary (micro) mechanical drive systems, one can also use acousto-optical modulators, especially in quick imaging systems for z-adjustment.

A preferred embodiment therefore uses two scanning systems that are independent in the x- and y-directions as the imaging system and manipulating system respectively, where at least one system has a programmable, automatically controllable beam deflection device so that a pixel-precise scan field coverage is possible with the help of the affine mapping Equations (1a, 1b). In this preferred embodiment, the scanning process in the z-direction affects both systems identically; e.g., the sample or the common objective is displaced in the z-direction. In this case, it must be guaranteed that the scanning planes of the two independent modules overlap fully. A mutual adjustment ensures that scanning planes are not misaligned relative to each other. The adjustment of the parallel scanning planes in the z-direction takes place preferably with the help of suitable motorized adjustable optics. The collimators described in DE 19702753 A1 are preferably used. The use of motorized optics for alignment of both z-scan planes in particular, enables the automatic correction of chromatic aberration of the different objectives used, at the different excitation and manipulation wavelengths.

If, however, the two independent scanning modules do not have any common beam direction on the sample, an independent scanning device is required for both systems in general in the z-direction. To implement a pixel-precise coverage of the x, y, and z-scanning devices in a three-dimensional space in this case, one must use the generalized Equations (2a-c).

The determination of the concerned transformation equation with the help of which the two independent scanning systems can be superimposed with pixel precision requires a suitable calibration method. Hence, it has already been mentioned that the affine mapping Equations (1a, b) can be determined uniquely if the coordinates of at least three scan field points are known in both the scanning coordinate systems.

FIG. 4 provides a schematic overview of the different calibration methods for the determination of the scan field coverage. It has already been explained at the beginning that the coverage of the scan fields of the two independent scanning systems depends on different adjustment dimensions. Thus for example, fine angle deviations between the different main and auxiliary beam splitters of the imaging system or between the different beam combiners used (compare FIGS. 1 and 2) result in measurable differences in the coverage of the two scanning systems. Especially in case of frequently used commercial scanning systems with Galvo mirrors as beam deflection device, the coverage of the two scan fields also depends on the scanning speed set in the two systems and the concerned selected scan zoom factor. In one embodiment of the invention, the calibration methods illustrated in FIG. 4 are determined for different setting combinations of the adjustment variables of the system that influence the scan field coverage (e.g., determination of mapping equation (1a, b) for the different main and auxiliary beam splitters of the system and the different beam combiners of the replacement device shown in FIG. 2). This can be undertaken individually for each of the settings by the device user, where suitable operating software is available. Another preferred embodiment of the invention enables the automatic determination of individual calibration settings for all adjustable combinations of all relevant adjustment variables, where the control software relies on the respective relevant calibration setting as a function of the selected device configuration.

In a calibration method according to the invention, the position of the stationary focus of the manipulating scanning system is determined with the help of the scanning imaging system. If this procedure is followed for a minimum of three focus positions of the manipulating system, it is possible to obtain a clear determination of the transformation equation (1a, b). Different practical embodiments of this calibration method are possible:

1. In the simplest case, the stationary laser focus of the manipulating system is observed directly by means of the confocal imaging system according to FIGS. 5a and b. In this calibration measurement, the imaging scanning module "scans" the object plane without irradiation by an excitation light. The manipulation focus appears in a dark image background (FIG. 5c) if and only if the stationary focus of the manipulating system is located within the detection volume of the imaging system. As the manipulating and imaging systems typically have the same incidence angle on the sample, a surface reflection of the manipulator focus is observed in a mirror located in the object plane, so that at least a small portion of this reflection (dotted line in FIGS. 5a and 5b) must pass through the beam combiner in the direction of the imaging system. This method is therefore particularly well-suited when a neutral splitter is used as a beam combiner. Due to the typically very high sensitivity of imaging confocal systems, this calibration method is ideal in practice, but is also similarly suitable for any convenient dichroic beam combiners in which in the ideal case less than 1% of the reflected (drawn as a dotted line) manipulation light passes the beam combiner in the direction of the imaging system. Further, this method requires an emission filter attachment in the imaging system which enables a direct observation of the manipulation wavelength. This is often not guaranteed in commercial systems, especially in the infrared and ultraviolet range.

2. In a modification of the calibration method 1 corresponding to FIG. 6 a-c, the stationary focus of the manipulating system is observed indirectly through the imaging system. In this context, the imaging system detects a frequency conversion such as luminescence, non-linear processes, or inelastic scattering such as Raman, which the stationary focus of the manipulating system creates in a suitable structure located in the object plane or an intermediate image plane. Here too, the imaging system scans the object plane without beaming excitation light, because the wavelength of the manipulating system is not observed directly. Instead of the light produced by it in the range of the visible spectrum, this additional calibration method is often better adapted to the spectral properties of the beam combiners and the emission filter in the system than calibration method 1. Accordingly, calibration method 2 also allows an adjustment of the scan field coverage in the z-direction—even while using manipulation light in the ultraviolet or infrared range—i.e., a spectral range in which the detection optics (pinhole optics) of commercial imaging systems is typically not corrected. Ideally, the layer thickness of the calibration structure in which the manipulating system creates the luminescent beam should be as small as possible because otherwise the spot observed in the imaging system becomes too large due to the absence of location discrimination with scattered light.

3. In another modification of calibration methods 1 and 2, a suitable unstructured sample substrate is modified through illumination with the stationary focus of the manipulating system, according to FIG. 7. This light-induced sample modification can be, e.g., bleaching, photo activation or photo conversion of a fluorescent coloring substance, or even a thermally or mechanically induced sample change (e.g., laser ablation). Decisive for the calibration process is that this light-induced modification is limited exclusively to the area of the stationary focus of the manipulating system, and it is at least temporarily stable. After this laser-induced sample modification is made at a minimum of three different scan field positions, the thus structured sample substrate is measured with the help of the imaging system. The difference from the calibration methods 1 and 2 is that the calibration is carried out in a two-step process in which after the sample structuring takes place, image detection with the excitation light of the imaging system is performed, if necessary, also by means of samples in which a modification, e.g., through optical switches can be reversed.

Decisive for the function of the three described calibration methods is a correct adjustment of the confocal opening of the concerned imaging system (e.g., pinhole for point scanners and slot opening for line scanners). In calibration methods 2 and 3, the signal light lies typically in the range of the visible spectrum (i.e., in the detection area typical in most applications). Hence, these calibration methods have the same requirements with regard to correct adjustment of the confocal opening as in the commercial confocal microscopes. In calibration method 1 however, the confocal opening is to be adjusted in such a way that a direct detection of laser light can take place in which the spectral range can lie, if necessary, even in the ultraviolet or infrared range.

Wavelength dependencies of the detection channel of the imaging system thus play the most crucial role in calibration method 1. In one embodiment of the invention, the three calibration methods 1-3 were combined with the automatic position optimization of the confocal opening. This automatic adjustment of the confocal opening can be performed interactively by the device user—a suitable software interface is available for this—or it can also be undertaken fully automatically by microscope systems within the framework of the actual calibration method. The optimum adjusting positions for the concerned device settings can be stored in the corresponding calibration records.

In general, calibration methods 1 to 3 combine a dynamic scanning process of one module with a static focus positioning of the other scanning module. For most of the aforementioned applications, however, no spot bleaching is carried out, but the bleaching process takes place within an extended "region of interest." All previously-described calibration methods have the disadvantage that dynamic effects of the beam deflection device of one of the scanning modules cannot be determined during the calibration of the scan field coverage. As explained earlier, such dynamic effects are encountered especially in Galvo scanners in which the scan field coverage can depend, for example, on the particular selected scanning speed and the particular scanning zoom.

This disadvantage is rectified with the help of a basically different calibration method illustrated in FIG. 8. In this dynamic calibration method ("area-based image matching"), a structured calibration specimen (shown as a grid) located in the object plane or a common intermediate image plane is mapped separately by the two independent scanning systems, in which the control of the direction of the beam deflecting device of at least one of the two scanning systems is adjusted according to Equations (1a, 1b) in such a way that the images of the structured calibration sample detected by the two systems are brought into line. This calibration method can be executed interactively by the device user, in which a suitable software interface is used to superimpose the sample images detected with the help of the two scanning systems. However, a fully automatic calibration routine is also conceivable in which the optimal superimposition of the sample images detected with the help of the two scanning systems is determined through computation, e.g., with the help of the cross correlation method. If Galvo scanners are used as beam deflecting devices, the electronic gain and offset settings of at least one scanning system are adjusted during the calibration of the scan field coverage.

A precondition of this calibration method is that both scanning systems enable the image detection of the calibration sample independently of each other. If no detector suitable for the image detection is integrated in the manipulating system (e.g., a cost-effective diode with simple grab electronics), then an external detector according to FIG. 8 (preferably in the transmission beam path) must be used for this purpose.

Figure 9:
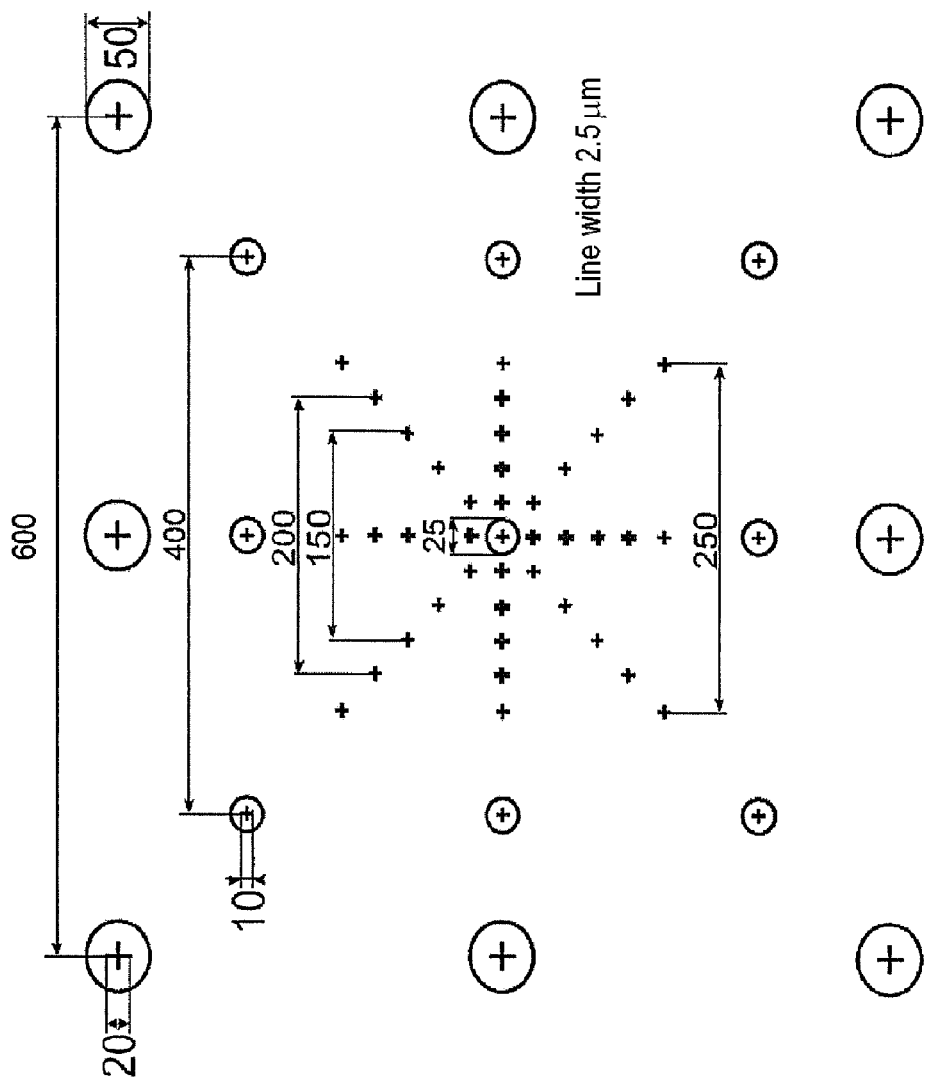
FIG. 9 illustrates an exemplary embodiment of a suitably structured calibration sample.

FIG. 9 illustrates an exemplary embodiment of a suitably structured calibration sample. This can be, e.g., a reflecting structure on a glass substrate or vice versa—a transparent structure on a reflecting substrate. In the calibration, the laser light reflected or transmitted (during use of an external detector) from the concerned scanning system on this calibration sample is used for image detection. If a line scanner with a bar mirror as a spatial filtering element (DE 10257237A1) is used as an imaging system, then neither the reflected laser light nor the transmitted laser light can be detected directly. In this case one can execute the described calibration method in which the calibration structure is brought in direct contact with a homogeneous fluorescence medium, where a dark sample structure is detected in a bright fluorescent background. Another option is to illuminate the sample structure with the help of a bulb in the wide field and to scan it with the help of a confocal scanning system.

Due to the parallel data collection, this method is ideal, particularly if a confocal linear scanner is used as the imaging system. This calibration method has the advantage of being a dynamic method, i.e., relative changes between the image field overlap between the two scanning modules can be determined directly as a function of the scanning speed and scanning zoom. Thus, the dynamic effects of each beam deflecting device can be considered in the respective calibration points.

All the thus far described methods of optimizing the scan field overlap can be automated with the help of suitable software in which a constant interaction of the device user is required. In contrast, the arrangement displayed in FIG. 10 enables a fully automatic calibration of the scan field coverage without involving the user. The second output of the beam combiner is used here to determine the mutual scan field coverage of the two scanning systems. Thus, corresponding to FIG. 10, even in case of dichroic beam combiners, a small portion of the incident light is reflected or transmitted in the direction of the second output. If there is a spatially resolving surface image detector (e.g., a CCD or CMOS camera or a quadrant diode), the relative position deviations between the two scanning modules can be determined directly and corrected automatically without requiring any further intervention of the user (such as e.g., the insertion of a calibration sample in the object plane). The arrangement displayed in FIG. 10 therefore is ideal particularly for automatic control processes that enable subsequent correction inside the device of the concerned optimum scan field coverage in case of fluctuating environmental influences (e.g., temperature) and variable device settings (e.g., beam combiners, main beam splitters, zoom optics, objectives, wavelengths).

We claim:

1. Method of operating a laser scanning microscope having a manipulation scanning system and an imaging scanning system having respective scan fields defined by respective first and second illuminating lights independently controlled in the x- and y-directions, and a beam-combiner for combining the illuminating lights of the manipulation and imaging scanning systems, the manipulation scanning system being controllable to provide a stationary focus, and the imaging system having an object field, wherein the coordinates of the x- and y-directions of the scan field of the manipulation system are represented as ordered pairs (k, j) and the coordinates of the x- and y-directions of the scan field of the imaging scanning systems are represented as ordered pairs (m, n), the method comprising the steps of:

creating a reference pattern of a minimum of three different points on an unstructured sample in the scan field of the manipulation scanning system through illumination-induced modification of the sample by stationary focus of the first illuminating light at a minimum of three different scan field positions;

using the imaging scanning system to detect an image of the reference pattern created on the sample in the step of creating the reference pattern;

creating an overlap of the reference pattern created with the manipulation scanning system with the image of the reference pattern detected by the imaging scanning system;

determining position deviations of k and j coordinates of the scan field of the manipulation scanning system and m and n coordinates of the scan field of the imaging scanning systems from each other based on the overlap;

using the position deviations to compute affine transformations of the k and j coordinates of the scan field of the manipulation scanning system to the respective m and n coordinates of the scan field of the imaging scanning system for bringing the k and j coordinates of the scan field of the manipulation scanning system into line with the respective m and n coordinates of the scan field of the imaging scanning system according to an affine mapping:

$$m = m_0 + \alpha_{11}k + \alpha_{12}j$$

$$n = n_0 + \alpha_{21}k + \alpha_{22}j; \text{ and}$$

taking into account the affine transformations in controlling at least one of the manipulation and imaging scanning systems, for at least one of:

calibrating at least one of the manipulation and imaging scanning systems, and achieving pixel-precise coverage of the scan field of the manipulation scanning system with the object field of the imaging scanning system.

2. Method of operating a laser scanning microscope according to claim 1, wherein the imaging scanning system is used to illuminate the reference pattern.

3. Method of operating a laser scanning microscope according to claim 1, wherein the reference pattern is created using light reflected by the sample at the different scan field positions.

4. Method of operating a laser scanning microscope according to claim 1, further comprising the step of generating a frequency-converted light through a non-linear or linear interaction of the first illuminating light with the sample, wherein the frequency-converted light is detected by the imaging scanning system and used to create the overlap.

5. Method of operating a laser scanning microscope according to claim 4, in which at least three luminescence points are created on the sample.

6. Method of operating a laser scanning microscope according to claim 4, wherein the reference pattern is created through inelastic light scattering.

7. Method of operating a laser scanning microscope according to claim 1, in which a statistical distribution structure of the sample itself serves as the reference pattern.

8. Method of operating a laser scanning microscope according to claim 1, wherein the affine transformation has at least three reference points.

9. Method of operating a laser scanning microscope according to claim 8, wherein the affine transformation is used to determine image coverage parameters including offset, angle of rotation and three stretching parameters; and
  wherein in the step of taking into account the coordinate transformations, the image coverage parameters are used to control a beam deflecting device of the manipulating scanning system to provide the pixel-precise coverage with the object field of the imaging scanning system.

10. Method of operating a laser scanning microscope according to claim 1, in which a point-scanning or line-scanning system, or a scanning point distribution system or a Nipkow system is used as the imaging scanning system.

11. Method of operating a laser scanning microscope according to claim 1, in which the manipulation scanning system is a point scanning device, and the scanning takes place in two directions.

12. Method of operating a laser scanning microscope according to claim 1, wherein the imaging scanning system directly detects the illumination of the sample.

13. Method of operating a laser scanning microscope according to claim 1, wherein the illumination of the sample with the stationary focus of the manipulation scanning system creates a frequency conversion, and the imaging scanning system indirectly detects the frequency-converted illumination of the sample.

14. Method of operating a laser scanning microscope according to claim 1, wherein in the step of creating a reference pattern, the modification induced by the modification-inducing illumination is limited exclusively to the area of the stationary focus of the manipulating scanning system, and is at least temporarily stable, and the step of using the imaging scanning system to detect an image of the reference pattern is carried separately from the step of creating a reference pattern, after the reference pattern is created.

15. Method of operating a laser scanning microscope according to claim 14, wherein in the step of creating a reference pattern, the modification-inducing illumination of the sample with the stationary focus of the manipulation scanning system is carried out by turning on and turning off of the illuminating light of the manipulation scanning system at the different scan field positions.

16. Method of operating a laser scanning microscope according to claim 1, wherein in the step of creating a reference pattern, for the stationary focus, the manipulation scanning system is controlled to rest while directed at each scan field position and after that to jump to the next scan field position.

17. Method of operating a laser scanning microscope according to claim 1, wherein in the step of creating a reference pattern, for the stationary focus, the manipulation scanning system is controlled to move over the sample and the modification-inducing illumination is switched on and off at each scan field position.

18. Method of operating a laser scanning microscope according to claim 1, wherein scanning of the first and second illuminating lights is identical in the z-direction, and wherein the method further comprises the step of aligning the z-scan planes to overlap fully.

19. Method of operating a laser scanning microscope according to claim 1, wherein the first and second illumination lights of the manipulation scanning system and the imaging scanning system are independently controlled in the z-direction, and wherein in the step of using the position deviations to compute coordinate transformations, the coordinate transformations are transformations in three-dimensional space.

20. A laser scanning microscope comprising:
  manipulation and imaging scanning systems having respective scan fields defined by first and second illuminating lights independently controlled in the x- and y-directions, the manipulation scanning system being controllable to provide a stationary focus of the first illumination light on an unstructured sample for creating a reference pattern of a minimum of three different points on the unstructured sample in the scan field thereof through modification-inducing illumination of the sample by the first illumination light at a minimum of three different scan field positions, and the imaging scanning system having an object field, wherein the coordinates of the x- and y-directions of the scan field of the manipulation system are represented as ordered pairs (k, j) and the coordinates of the x- and y-directions of the scan field of the imaging scanning systems are represented as ordered pairs (m, n),
  a beam-combiner for combining the illuminating lights of the manipulation and imaging scanning systems,
  at least one detector in the imaging scanning system for detecting an image of the reference pattern created on the sample; and
  means for creating an overlap of the reference pattern created by the manipulation scanning system with the image of the reference pattern detected by the at least one detector, for determining position deviations of k and j coordinates of the scan field of the manipulation scanning system and respective m and n coordinates of the imaging scanning system from each other based on the overlap, for using the position deviations to compute affine transformations of the k and j coordinates of the scan field of the manipulation scanning system to the respective m and n coordinates of the scan field of the imaging scanning system for bringing the k and j coordinates of the scan field of the manipulation scanning system into line with the respective m and n coordinates of the scan field of the imaging scanning system according to an affine mapping:

$$m = m_0 + \alpha_{11}k + \alpha_{12}j$$

$$n = n_0 + \alpha_{21}k + \alpha_{22}j;\text{ and}$$

and for taking into account the affine transformations in controlling at least one of the manipulation and imaging scanning systems, for at least one of:
    calibrating at least one of the manipulation and imaging scanning systems, and
    achieving pixel-precise coverage of the scan field of the manipulation scanning system with the object field of the imaging scanning system.

21. Laser scanning microscope according to claim 20, in which the imaging scanning system is a point-scanning system, a line-scanning system, a scanning point distribution system or a Nipkow system.

22. Laser scanning microscope according to claim 20, in which the manipulating scanning system is a point scanner and the scanning takes place in two directions.

23. Laser scanning microscope according to claim 20, with at least one laser as the illuminating light.

24. Laser scanning microscope according to claim 20, in which a movement takes place over the sample in at least one scanning direction.

25. Laser scanning microscope according to claim 20, wherein the manipulation scanning system further comprises a beam deflecting device.

26. Laser scanning microscope according to claim 25, wherein the beam deflecting device includes a Galvo scanner and a control unit for the Galvo scanner, wherein a coordinate transformation takes place through the modification of gain and offset values of the control unit.

27. Method of operating a laser scanning microscope having a manipulation scanning system and an imaging scanning system having respective scan fields defined by respective first and second illuminating lights independently controlled in the x- and y-directions, and a beam-combiner for combining the illuminating lights of the manipulation and imaging scanning systems, the manipulation scanning system and the imaging scanning system each having a programmable, automatically controllable beam deflecting device, and the imaging scanning system having an object field, wherein the coordinates of the x- and y-directions of the scan field of the manipulation system are represented as ordered pairs (k, j) and the coordinates of the x- and y-directions of the scan field of the imaging scanning systems are represented as ordered pairs (m, n), the method comprising the steps of:

arranging a structured reference pattern in the form of a grid in the plane of the sample or an intermediate image plane;

following the step of arranging of the reference pattern, detecting an image of the reference pattern with the manipulation scanning system and with the imaging scanning system independently of each other;

creating an overlap of the image of the reference pattern detected with the manipulation scanning system with the image of the reference pattern detected with the imaging scanning system;

determining position deviations of k and j coordinates of the scan field of the manipulation scanning system and respective m and n coordinates of the imaging scanning system from each other based on the overlap;

using the position deviations to compute affine transformations of the k and j coordinates of the scan field of the manipulation scanning system to the respective m and n coordinates of the scan field of the imaging scanning system for bringing the k and j coordinates of the scan field of the manipulation scanning system into line with the respective m and n coordinates of the scan field of the imaging scanning system according to an affine mapping:

$m = m_0 + \alpha_{11} k + \alpha_{12} j$ $n = n_0 + \alpha_{21} k + \alpha_{22} j$, and using the affine transformations to adjust the beam deflecting device of at least one of the manipulation scanning system and the imaging scanning system to bring the images of the reference pattern into line with each other.

28. Method of operating a laser scanning microscope according to claim 27, wherein the affine transformation has at least three reference points.

29. Method of operating a laser scanning microscope according to claim 28, wherein the affine transformation is used to determine image coverage parameters including offset, angle of rotation and three stretching parameters; and wherein in the step of taking into account the coordinate transformations, the image coverage parameters are used to control a beam deflecting device of the manipulating system to provide a pixel-precise coverage with the object field of the imaging scanning system.

30. A laser scanning microscope comprising:

a structured reference pattern in the form of a grid arranged in the plane of a sample or an intermediate image plane, a manipulation scanning system and an imaging scanning system having respective scan fields defined by first and second illuminating lights independently-controlled in the x- and y-directions for independently illuminating the reference pattern, at least one of the manipulation scanning system and the imaging scanning system having a programmable, automatically controllable beam deflecting device, and the imaging scanning system having an object field, wherein the coordinates of the x- and y-directions of the scan field of the manipulation system are represented as ordered pairs (k, j) and the coordinates of the x- and y-directions of the scan field of the imaging scanning systems are represented as ordered pairs (m, n), a beam-combiner for combining the illuminating lights of the manipulation and imaging scanning systems, means for detecting independently from each other first and second images of the reference pattern resulting respectively from illumination of the reference pattern by the first and second illumination lights, and means for creating an overlap of the independently detected first and second images, for determining position deviations of k and j coordinates of the scan field of the manipulation scanning system and respective m and n coordinates of the imaging scanning system from each other based on the overlap, for using the position deviations to compute affine transformations of the k and j coordinates of the scan field of the manipulation scanning system to the respective m and n coordinates of the scan field of the imaging scanning system for bringing the k and j coordinates of the scan field of the manipulation scanning system into line with the respective m and n coordinates of the scan field of the imaging scanning system according to an affine mapping:

$m = m_0 + \alpha_{11} k + \alpha_{12} j$ $n = n_0 + \alpha_{21} k + \alpha_{22} j$, and for using the affine transformations to adjust the beam deflecting device of at least one of the manipulation scanning system and the imaging scanning system to bring the images of the reference pattern into line with each other.

* * * * *